US011496166B1

(12) United States Patent
Lagler et al.

(10) Patent No.: US 11,496,166 B1
(45) Date of Patent: Nov. 8, 2022

(54) PREDISTORTION METHOD AND SYSTEM FOR A NON-LINEAR DEVICE-UNDER-TEST

(71) Applicant: Rohde & Schwarz GmbH & Co. KG, Munich (DE)

(72) Inventors: Andreas Lagler, Rosenheim (DE); Florian Ramian, Karlsfeld (DE); Karolin Werthmueller, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 17/464,191

(22) Filed: Sep. 1, 2021

(51) Int. Cl.
*H04B 1/04* (2006.01)
(52) U.S. Cl.
CPC .................. *H04B 1/0475* (2013.01)
(58) Field of Classification Search
CPC ........ H04B 1/0475; H04B 1/04; H04B 10/07; H04B 3/46
USPC .................................................. 375/295–297
See application file for complete search history.

(56) References Cited

U.S. PATENT DOCUMENTS

| 9,160,280 | B1 * | 10/2015 | Abdelhafiz | H03F 1/3241 |
| 10,523,159 | B2 * | 12/2019 | Megretski | H03F 1/3247 |
| 2014/0333376 | A1 * | 11/2014 | Hammi | H03F 1/3247 |
|  |  |  |  | 330/149 |
| 2015/0160279 | A1 * | 6/2015 | Zhou | H03F 3/189 |
|  |  |  |  | 324/626 |
| 2016/0334466 | A1 * | 11/2016 | Rivoir | G01R 31/3191 |
| 2021/0018561 | A1 * | 1/2021 | Ruengeler | G01R 13/0236 |

OTHER PUBLICATIONS

Weiβ et al., "K18D MATLAB Modeling Toolkit", Application Note, retrieved from https://scdn.rohde-schwarz.com/ur/pws/dl_downloads/dl_application/application_notes/1ef105/1EF105_1e_K18D_MATLAB_Modeling_Toolkit.pdf, Mar. 25, 2019, pp. 1-13.

* cited by examiner

*Primary Examiner* — Emmanuel Bayard
(74) *Attorney, Agent, or Firm* — Ditthavong, Steiner & Mlotkowski

(57) ABSTRACT

The present disclosure relates to a predistortion method and a predistortion system for a non-linear device-under-test, DUT. The predistortion method comprises the steps of: providing a reference input waveform to the DUT; deriving a predistorted waveform for the DUT based on the reference input waveform using an iterative direct digital predistortion technique; analyzing a relationship between the reference input waveform and the calculated predistorted waveform using a mathematical model; deriving a predistortion algorithm for the DUT based on said analysis; and applying said predistortion algorithm to an input signal and feeding the, thus, predistorted input signal to the DUT.

15 Claims, 6 Drawing Sheets

PREDISTORTION METHOD AND SYSTEM FOR A NON-LINEAR DEVICE-UNDER-TEST

TECHNICAL FIELD

The present disclosure relates to digital predistortion techniques for signal amplifiers. In particular, the present disclosure relates to predistortion methods and to a predistortion system for a non-linear device-under-test.

BACKGROUND ART

It is known that power amplifiers can introduce signal distortions which can lead to a deterioration of signal quality in wireless communication systems.

Besides noise and frequency response the distortions introduced by a power amplifier can contain non-linearities and memory effects. The non-linearity of a power amplifier can result in a broadening of the spectrum, also called spectral regrowth. Broadening of the spectrum refers to undesired spectral components which occur at frequencies that are not contained in the input signal. The occurrence of memory effects means that an output of the amplifier at a certain time not only depends on the input at the same time, but also on previous inputs. Such unwanted effects typically occur when operating at higher power levels and/or bigger bandwidths.

For 5G systems such memory effects can be significant. In particular, 5G allows the use of bigger bandwidths as, e.g., compared to LTE. For example, for the communication from a mobile device to a base station (uplink) bandwidths of up to 100 MHz are possible.

It is known to use predistortion methods to mitigate distortions introduced by an amplifier. In general, such techniques apply the inverse of a distortion to the signal before it is fed into the amplifier.

In a typical test equipment, real-time digital predistortion, e.g. predistortion of a signal directly when it is forwarded to an amplifier, is however only performed for non-linear effects. Digital predistortion of both memory and non-linear effects is, for example, only done in a post-processing step, but not in real-time.

SUMMARY

Thus, there is a need to provide an improved predistortion method and an improved predistortion system for a non-linear device-under-test. In particular, the above-mentioned disadvantages should be avoided.

According to a first aspect, the present disclosure relates to a predistortion method for a non-linear device-under-test (DUT), comprising
  providing a reference input waveform to the DUT;
  deriving a predistorted waveform for the DUT based on the reference input waveform using an iterative direct digital predistortion technique;
  analyzing a relationship between the reference input waveform and the derived predistorted waveform using a mathematical model;
  deriving a predistortion algorithm for the DUT based on said analysis; and
  applying said predistortion algorithm to an input signal and feeding the, thus, predistorted input signal to the DUT.

This achieves the advantage that an efficient real-time predistortion of an input signal for a non-linear DUT can be performed. In particular, this predistortion is based on a DUT specific algorithm which is determined based on an iterative characterization and subsequent mathematical modelling of certain DUT characteristics. This real time predistortion can take into account non-linearities and memory effects of the DUT.

In particular, the term non-linear DUT may refer to a DUT which has non-linear transfer characteristics at least within a certain frequency range. In other words: a DUT for which a change in an input signal does not always produce a proportional change in an output signal.

For example, the non-linear DUT is a non-linear amplifier, such as a power amplifier. An output waveform of the DUT can be an amplified waveform of an input waveform of the DUT. Here, the term waveform refers to an RF signal with a specific shape, which, e.g. can be represented in terms of its frequency spectrum (signal strength over frequency).

The derived predistortion algorithm, for example, comprises digital predistortion coefficients based on which the input signal for the DUT can be predistorted.

The iterative direct digital predistortion (iterative direct DPD) technique may derive the predistorted waveform based on the reference input waveform and at least one output waveform of the DUT. The at least one output waveform is, for instance, generated by the DUT in response to the reference input waveform. In particular, the interactive direct DPD compares an output waveform to the reference input waveform on a sample-by-sample basis (iteratively) and modifies each sample individually in amplitude and phase to derive the predistorted waveform. Thereby, the iterative direct DPD may use a gain expansion technique to maximize the characterization range regarding the DUT input level. The iterative direct DPD may converge after a number of iterations, e.g. 5-10 iterations.

In particular, the predistortion algorithm enables a signal generator to perform a real-time predistortion of an input signal for the DUT. Real-time predistortion may refer to a predistortion of an input signal "in real time", i.e. directly when it is produced and/or forwarded to the DUT, such that the input signal that is fed to the DUT, e.g. for amplification by the DUT, is already predistorted. In particular, the real-time predistortion is a digital predistortion (DPD) technique.

In particular, the relationship between the reference input waveform and the derived predistorted waveform can be modeled with a mathematical relationship. The relationship can be expressed in terms of parameters of the mathematical model that go from the reference input waveform to the predistorted waveform. The analysis of the relationship can comprise using the mathematical model to derive said parameters based on a real-time hardware of the DUT.

For example, the step of analyzing the relationship between the reference input waveform and the predistorted waveform comprises: using the mathematical model to fit the reference input waveform to the predistorted waveform and, thereby, deriving parameters of the mathematical model, said parameters depending on the fitting.

In an embodiment, the predistortion algorithm compensates non-linear distortions (i.e. non-linearities of the DUT) as well as memory effects of the DUT, in particular when being applied to the input signal. This achieves the advantage that the predistortion of the input signal can be a real-time memory predistortion. The step of applying the predistortion algorithm to an input signal and feeding the, thus, predistorted input signal to the DUT may correspond to performing a real-time memory DPD of the input signal.

Memory effects of the DUT may refer to distortions in an output signal of the DUT not only depending on the current input signal, but also on previous input signals, i.e. on the "memory" of the DUT of previous signals.

In an embodiment, the mathematical model comprises a Hammerstein model, a Wiener model, a Volterra series model or a memory polynomial model.

In an embodiment, a starting point for the Hammerstein model is chosen randomly, and, in case the randomly chosen starting point does not converge, a different starting point is used.

In an embodiment, the step of analyzing the relationship between the reference input waveform and the derived predistorted waveform using the mathematical model comprises calculating parameters of the mathematical model, wherein said parameters depend on a hardware configuration of the DUT. For example, the parameters are coefficients of a Hammerstein model (e.g., non-linearity and filter).

In an embodiment, a peak power of the reference waveform is increased while performing the iterative direct digital predistortion.

According to a second aspect, the present disclosure relates to a predistortion method for a non-linear device-under-test (DUT), comprising:
  providing a reference input waveform to the DUT;
  deriving a predistorted waveform for the DUT based on the reference input waveform using an iterative direct digital predistortion technique;
  analyzing a relationship between the reference input waveform and the derived predistorted waveform using a mathematical model;
  deriving a predistortion algorithm based on said analysis; and
  applying said predistortion algorithm in a signal generator.

This achieves the advantage that a predistortion algorithm for a real-time predistortion of signals for a non-linear DUT can be efficiently determined. Said algorithm can then be used in a signal generator to predistort signals that are generated by the signal generator and forwarded to the DUT. In particular, no dedicated hardware is required for the predistortion, which leads to an improved flexibility regarding frequency and bandwidth requirements.

The iterative direct digital predistortion (iterative direct DPD) technique may derive the predistorted waveform based on the reference input waveform and an output waveform of the DUT. The output waveform is, for instance, generated by the DUT (e.g., an amplifier) in response to the reference input waveform.

In particular, the predistortion algorithm is determined based on an iterative characterization and subsequent mathematical modelling of the DUT. This algorithm can take into account non-linearities and/or memory effects of the DUT.

In particular, the signal generator has a user-defined non-linearity as well as a configurable filter designed into its hardware. The non-linearity and/or filter of the signal generator can be adapted based on the derived predistortion algorithm in order to predistort a signal.

In an embodiment, the predistortion algorithm compensates memory effects of the DUT in particular when being applied to an input signal for the DUT by the signal generator. This achieves the advantage that the predistortion of the input signal can be a real-time memory predistortion.

In an embodiment, the signal generator is configured to perform a real-time predistortion of an input signal for the DUT based on said predistortion algorithm. For example, the signal generator comprises a predistortion unit which is configured to perform the real-time predistortion of the input signal based on said predistortion algorithm.

In an embodiment, the mathematical model comprises a Hammerstein model, a Wiener model, a Volterra series model, or a memory polynomial model.

In an embodiment, a starting point for the Hammerstein model is chosen randomly, and, in case the randomly chosen starting point does not converge, a different starting point is used.

In an embodiment, the step of analyzing the relationship between the reference input waveform and the derived predistorted waveform using the mathematical model comprises calculating parameters of the mathematical model, wherein said parameters depend on a hardware configuration of the DUT.

In an embodiment, a peak power of the reference waveform is increased while performing the iterative direct digital predistortion.

According to a third aspect, the present disclosure relates to a predistortion system for a non-linear device-under-test (DUT), comprising: a signal source configured to generate a reference input waveform to the DUT; a signal analyzer configured to receive an output waveform of the DUT; a processing unit configured to derive a predistorted waveform based on the reference input waveform and the output waveform using an iterative direct digital predistortion technique; wherein the processing unit is configured to analyze a relationship between the reference input waveform and the derived predistorted waveform using a mathematical model, and wherein the processing unit is configured to derive a predistortion algorithm for the DUT based on said analysis; wherein the system further comprises a predistortion unit configured to apply said predistortion algorithm to an input signal for the DUT.

In particular, applying said predistortion algorithm to the input signal for the DUT refers to adapting the input signal based on the parameters of the predistortion algorithm.

In an embodiment, the predistortion unit is configured to perform a real-time predistortion of the input signal based on said predistortion algorithm.

In an embodiment, the system further comprises a signal generator configured to feed the, thus, predistorted input signal to the DUT.

The signal analyzer can be a spectrum analyzer, oscilloscope or a network analyzer. The signal analyzer can be configured to provide measurement results to verify a digital predistortion (DPD) performance. The predistortion unit can be a component of the signal generator.

In an embodiment, the predistortion algorithm compensates memory effects of the DUT, in particular when being applied to the input signal. This achieves the advantage that the predistortion of the input signal can be a real-time memory predistortion.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
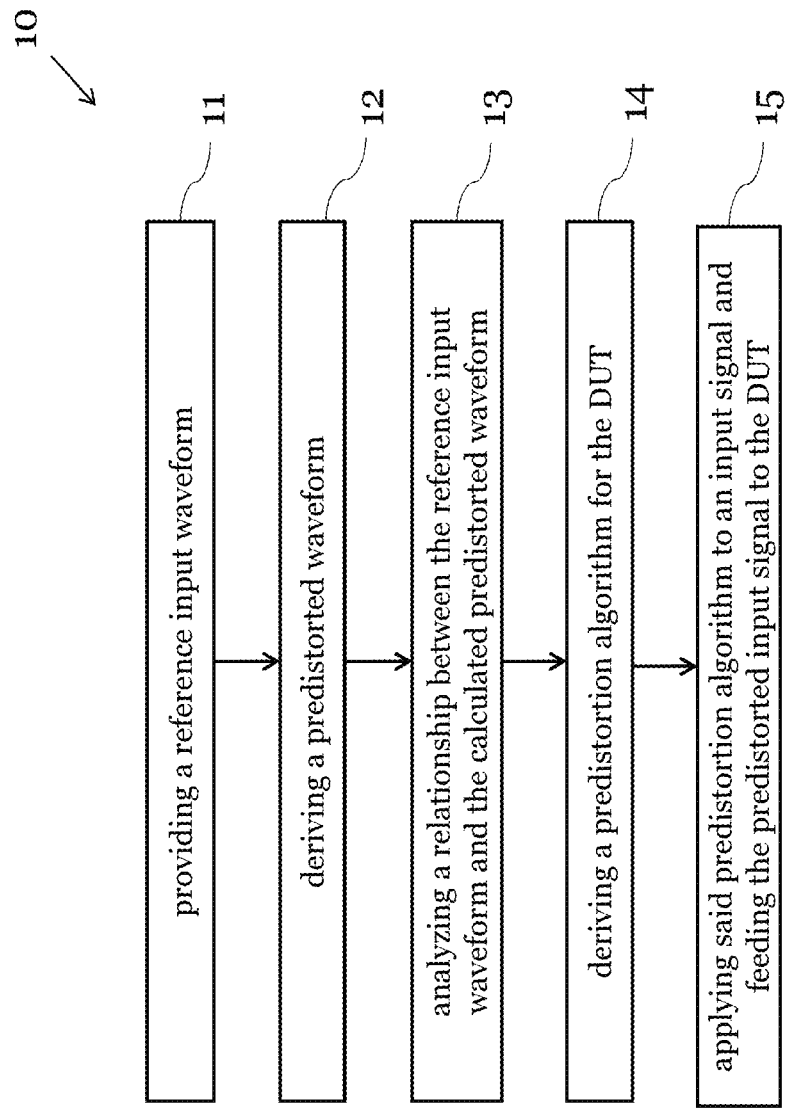
FIG. 1 shows a flow diagram of a predistortion method for a non-linear DUT according to an embodiment.

FIG. 1 shows a flow diagram of a predistortion method 10 for a non-linear DUT according to an embodiment.

The predistortion method 10 comprises the steps of: providing 11 a reference input waveform to the DUT; deriving 12 a predistorted waveform for the DUT based on the reference input waveform using an iterative direct digital predistortion technique; analyzing 13 a relationship between the reference input waveform and the derived predistorted waveform using a mathematical model; deriving 14 a predistortion algorithm for the DUT based on said analysis; and applying 15 said predistortion algorithm to an input signal and feeding the, thus, predistorted input signal to the DUT.

The DUT can be an amplifier, such as a power amplifier. The DUT can be configured to amplify signals according to the 5G technology standard, e.g. signals with bandwidths of up to 100 MHz. For instance, the input signal can be a 5G uplink signal.

In particular, the predistortion algorithm compensates non-linearities caused by the DUT and memory effects of the DUT. Thus, in the step of applying 15 the predistortion algorithm to the input signal and, subsequently, feeding the input signal to the DUT, a real-time memory predistortion of the input signal can be performed.

The iterative direct digital predistortion (iterative direct DPD) technique typically compares the reference input waveform to an output waveform of the DUT on a sample-by-sample basis (iteratively) and modifies each sample individually in amplitude and phase to derive the predistorted waveform. The iterative direct DPD may converge after a number of iterations, e.g. 5-10 iterations. Thus, in step 12, the predistorted waveform for the DUT can be derived by the iterative direct DPD based on the reference input waveform and a distorted output waveform of the DUT.

In particular, the iterative direct DPD technique is model-independent, i.e. it is not limited by any model parameters. The iterative approach allows the modelling of memory effects of the DUT without increasing the complexity, because the memory effects are present in the measured samples.

During iterative direct DPD, a peak power of the reference waveform can be increased in order to acquire a more precise model and/or to enhance the dynamic range. In particular, by enhancing the peak power in a non-linear range of the DUT, the effect of gain compression (i.e., the output signal progressively deviating from a linear relation to the input signal) can be reduced.

The mathematical model used in the step 13 can take into account the real-time hardware of the DUT when deriving the parameters that correlate the reference input waveform with the predistorted waveform. In other words, in the step 13 parameters of the mathematical models are derived, said parameters being based on the specific hardware of the DUT.

For example, the mathematical model can comprise a Hammerstein model, a Wiener model, a Volterra series model, a memory polynomial model or another suitable polynomial model. In particular, these mathematical models are capable to characterize memory effects of the DUT.

The Volterra series can be used to model time invariant non-linear dynamic systems and can, therefore, be applied to model the non-linearity and memory effects of a DUT, e.g. a power amplifier.

The Volterra Series model can be written in a discrete form as:

$$y_{VS}[n] = \sum_{m_1=0}^{M} h_1(m_1)x[n-m_1]$$
$$+ \sum_{m_1=0}^{M} \sum_{m_2=0}^{M} h_2(m_1, m_2)x[n-m_1]x[n-m_2]$$
$$\vdots$$
$$+ \sum_{m_1=0}^{M} \ldots \sum_{m_K=0}^{M} h_2(m_1, \ldots, m_2)x[n-m_1] \ldots x[n-m_K],$$

Thereby, $h_n$ are Volterra kernels, M is a memory depth, K is an order of the non-linearity and x[n] is an input signal. The Volterra series can be described as a linear superposition of non-linear effects. Therefore, it is possible to calculate the kernels (parameters of the model) linearly.

The memory polynomial model can be obtained from the Volterra series, in particular when only considering samples of the input vector with the same time shift and neglecting the cross terms. By not using the cross terms of the Volterra series, the memory polynomial model reduces the number of parameters, thus, offering a higher performance and lower complexity as compared to the Volterra series.

The Hammerstein model is a box-oriented model with a reduced complexity compared to the memory polynomial model. The Hammerstein model consists of a filter and a non-linearity. Thereby, the non-linearity is static with all time-dependent components being compensated with the filter, e.g. a Finite Impulse Response (FIR) filter. The Wiener model is similar to the Hammerstein model with the difference between these models being a reverse order of filter and non-linearity.

An output signal of the Hammerstein model can be written as follows:

$$y_{HM}[n] = \sum_{m=0}^{M-1} \sum_{\substack{k=1}}^{K} h_m c_k x[n-m] |x[n-m]|^{k-1},$$

with M being the memory length, K being the polynomial degree, $c_k$ being complex coefficients of the non-linearity and $h_m$ being complex coefficients of the FIR filter. The coefficient $c_k$ and $h_m$ can be stacked into vecotrs c and h. The Hammerstein Model can be written as a memory polynomial model with a memory polynomial model parameter matrix $A = c \cdot h^T$. The memory polynomial coefficients (filter and non-linearity) can be calculated based on a Least Squares Problem approach, for example, using a normalized iterative algorithm or other suitable approach. In particular, the non-linearity is thereby described by the elements of c and the filter by the elements of h.

To derive the parameters filter and non-linearity of the Hammerstein model with this approach, a starting point for either c or h is first chosen. This starting point can be chosen randomly. With a good starting point, the algorithm usually converges in less than 50 iterations. Thus, the parameters can be determined by choosing a starting point, let the algorithm compute c and h and if it did not converge after a number of iterations, e.g. 50 iterations, use a different starting point.

The step 13 of analyzing the relationship may comprise using the Hammerstein model to fit the reference waveform to the predistorted waveform, which was derived via direct iterative DPD (step 12), and determining parameters (e.g., the coefficients for filter and non-linearity) of the fitted Hammerstein model based on said fitting. In particular, the determined parameters of the Hammerstein model depend on the specific hardware configuration of the DUT and take into account non-linearities and/or memory effects of the DUT.

Figure 2:
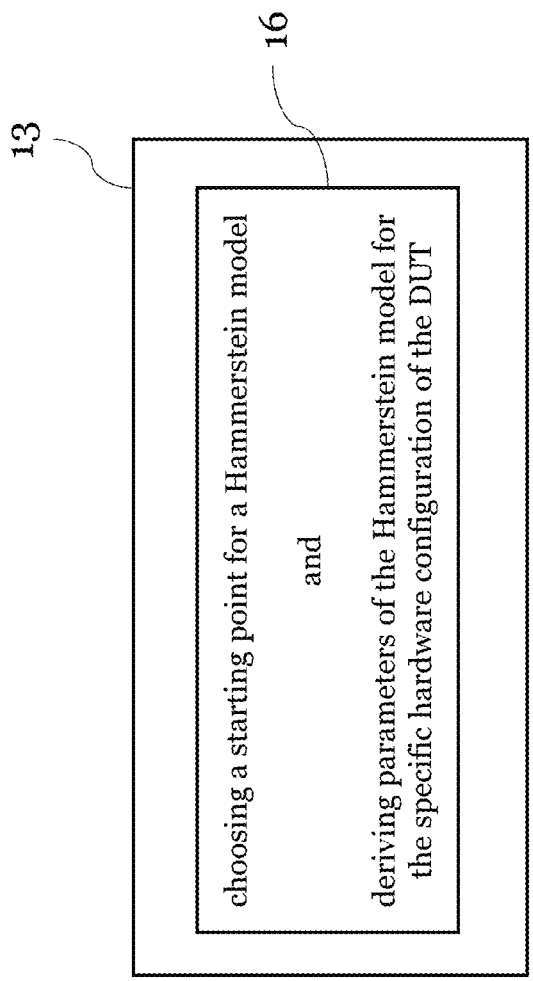
FIG. 2 shows a flow diagram of a step of the predistortion method shown in FIG. 1 according to an embodiment.

FIG. 2 shows a flow diagram of sub-steps of step 13 of the predistortion method 10 shown in FIG. 1 according to an embodiment. According to the above, the step 13 comprises the sub-step 16 of choosing a starting point for the Hammerstein model, e.g. choosing the starting point randomly, and deriving parameters of the Hammerstein model, e.g. based on a fitting of the Hammerstein model to the predistorted waveform derived via iterative direct DPD in step 12. If the chosen starting point does not converge after a number of iterations, a different starting point can be chosen.

The predistortion algorithm can then be derived (step 14) based on the determined coefficients from the Hammerstein model.

Based on the determined parameters of the Hammerstein model (filter and non-linearity) an input signal for the DUT can be modified, e.g. by adapting a signal generator, which generates and the input signal, according to these parameters. The, thus, predistorted input signal can then be fed to the DUT.

Figure 3:
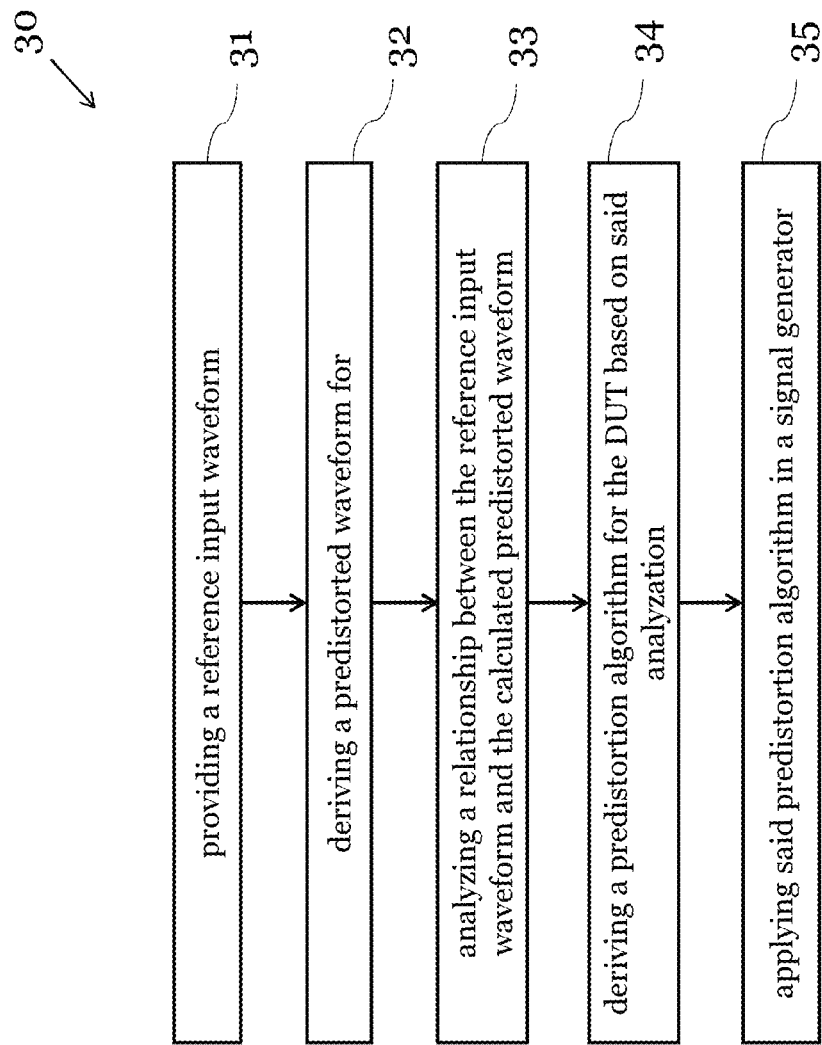
FIG. 3 shows a flow diagram of a predistortion method for a non-linear DUT according to an embodiment.

FIG. 3 shows a flow diagram of another predistortion method 30 for the non-linear DUT according to an embodiment.

The predistortion method 30 comprises the steps of: providing 31 a reference input waveform to the DUT; deriving 32 a predistorted waveform for the DUT based on the reference input waveform using an iterative direct digital predistortion technique; analyzing 33 the relationship between the reference input waveform and the derived predistorted waveform using a mathematical model; deriving 34 a predistortion algorithm based on said analysis; and applying 35 said predistortion algorithm in a signal generator.

The method 30 shown in FIG. 3 can be performed in a test and measurement instrument or setup for any given DUT. The DUT can be a non-linear amplifier, such as a power amplifier.

In particular, the method steps 31 to 34 of the method 30 shown in FIG. 3 can be identical to the method steps 11 to 14 of the method 10 shown in FIG. 1.

For example, the signal generator has a configurable non-linearity and a configurable filter designed into its hardware. The non-linearity is, for example, user adjustable. The non-linearity and filter of the signal generator can be represented by a Hammerstein model. Thus, the step of applying 35 the predistortion algorithm in a signal generator, may comprise applying the predistortion algorithm derived in step 34 (which contains the parameters of the Hammerstein Model) to the signal generator and, thereby, adjusting the configurable non-linearity and filter of the signal generator based on the derived non-linearity and filter according to the Hammerstein model.

In particular, the signal generator is configured to perform a real-time predistortion of an input signal for the DUT based on the applied predistortion algorithm. The signal generator can comprise a predistortion unit which is configured to apply said predistortion algorithm to an input signal for the DUT. The predistortion algorithm can take into account non-linear distortions as well as memory effects of the DUT.

Figure 4:
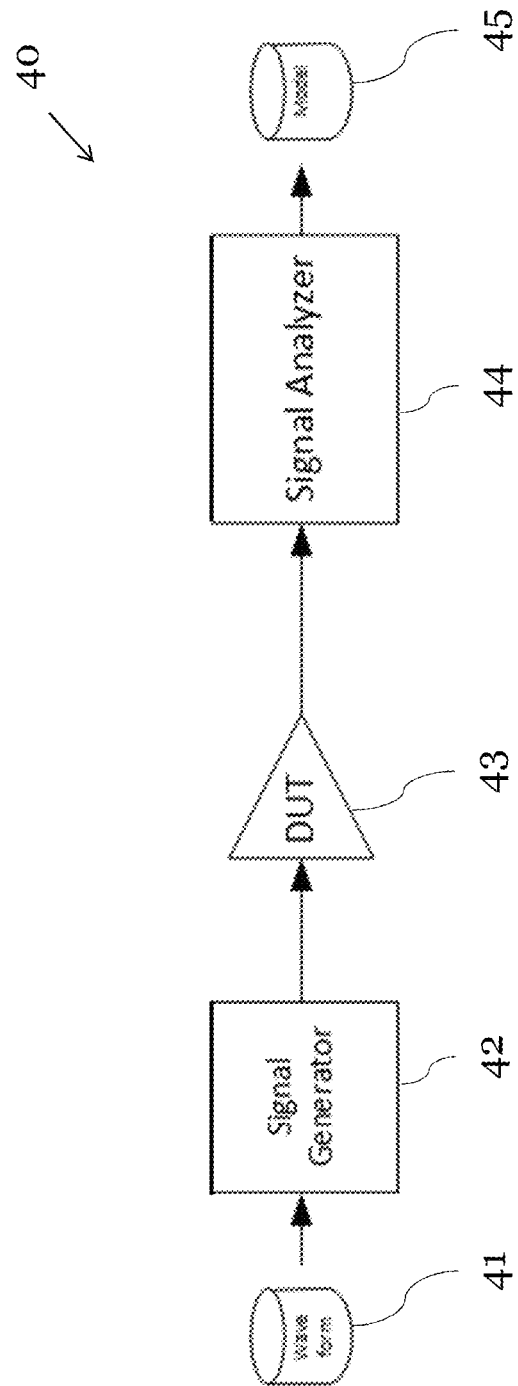
FIG. 4 shows a schematic diagram of a system for characterizing a non-linear DUT according to an embodiment.

FIG. 4 shows a schematic diagram of a system 40 for characterizing a non-linear DUT 43 according to an embodiment.

The system 40 can be configured to characterize the DUT 43 using iterative direct DPD (MC, iterative learning control), ideally at the operating point of DUT 43. Thereby, a signal generator 42 provides the DUT 43 with an input waveform 41. A signal analyzer 44, e.g. a spectrum analyzer, an oscilloscope or a network analyzer, provides a distorted DUT output waveform from the DUT 43. An iterative direct DPD algorithm using the DUT input and output waveform can be used to calculate a predistorted DUT input waveform. This direct DPD algorithm, for instance, uses a gain expansion technique to maximize the characterization range regarding a DUT input level. Subsequently, a Hammerstein model 45 can be derived by fitting a DUT input waveform to the predistorted DUT input waveform.

Figure 5:
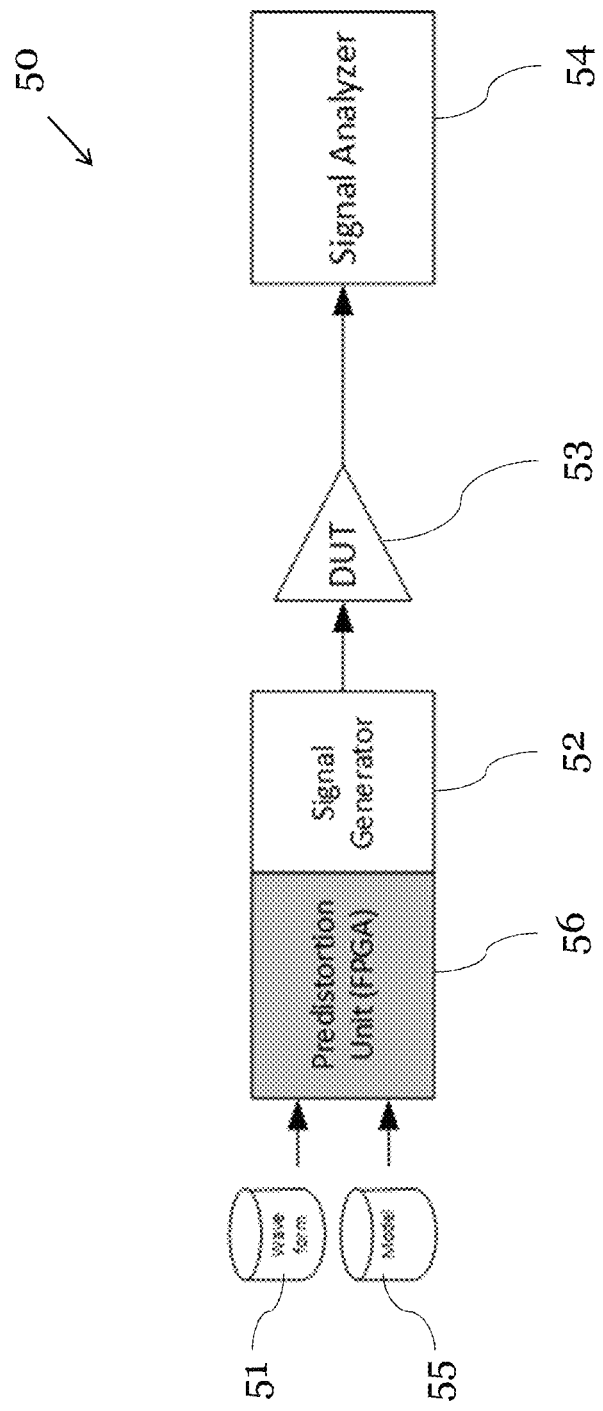
FIG. 5 shows a schematic diagram of a system for performing a predistortion of a DUT input waveform according to an embodiment.

FIG. 5 shows a schematic diagram of a system 50 for performing a predistortion of a DUT input waveform according to an embodiment.

The system 50 can be configured to perform a real-time predistortion of a DUT input waveform 51. Therefore, a digital predistortion unit 56 of the system uses the derived Hammerstein model 55 (e.g., derived with the system 40 in FIG. 4) to generate a predistorted DUT input waveform comprising a memory-less nonlinearity and a linear filter. A signal generator 52 can provide the, thus, predistorted input waveform to the DUT 53. The predistortion unit 56 can be a component of the signal generator 52. Optionally, a signal analyzer 54, e.g. a spectrum analyzer, an oscilloscope or a network analyzer, can provide measurement results to verify a DPD performance.

Figure 6:
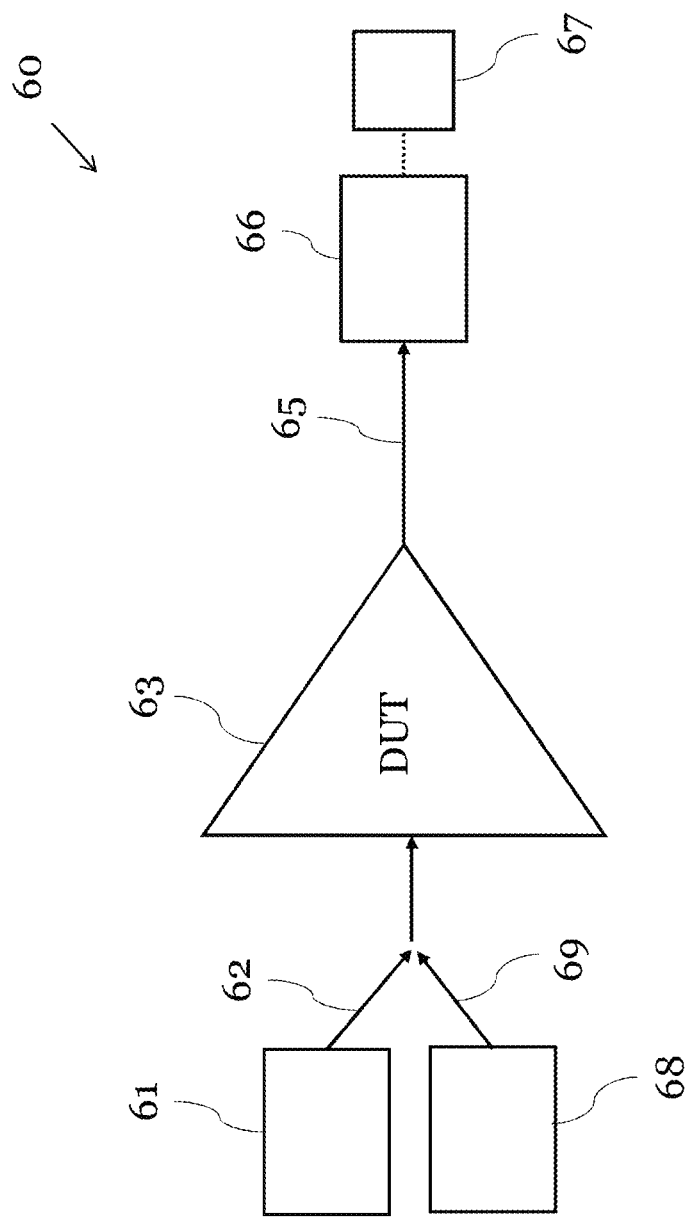
FIG. 6 shows a schematic diagram of a predistortion system for a non-linear DUT according to an embodiment.

FIG. 6 shows a schematic diagram of a predistortion system 60 for the non-linear DUT 63 according to an embodiment.

The system 60 comprises a signal source 61 configured to generate a reference input waveform 62 to the DUT 63, a signal analyzer 66 configured to receive an output waveform 65 of the DUT 63, and a processing unit 67 configured to derive a predistorted waveform based on the reference input waveform 62 and the output waveform 65 using an iterative direct digital predistortion technique. The processing unit 67 can be configured to analyze a relationship between the reference input waveform 62 and the derived predistorted waveform using a mathematical model, and to derive a predistortion algorithm for the DUT 63 based on said analysis. The system 60 further comprises a predistortion unit 68 which is configured to apply said predistortion algorithm to an input signal 69 for the DUT 63.

The system 60 can form a test environment for the DUT 63. The system 60 can be an implementation of a real-time DPD that can be derived by using the methods 10, 30 shown in FIGS. 1 to 3. In particular, the system 60 can be configured to carry out any one of the methods 10, 30 shown in FIGS. 1 to 3.

The DUT 63 can be an amplifier, such as a power amplifier. The DUT 63 can be configured to amplify signals according to the 5G technology standard, e.g. signals with bandwidths of up to 100 MHz. For instance, the input signal is a 5G uplink signal.

In particular, the predistortion algorithm compensates non-linearities and/or memory effects of the DUT 63. Thus, in the step of applying 15 the predistortion algorithm to the input signal and, subsequently, feeding the input signal to the DUT 63, a real-time memory predistortion of the input signal can be performed.

The signal analyzer 66 can be a spectrum analyzer, an oscilloscope or a network analyzer. The signal analyzer 66 can provides measurement results to verify a DPD performance. The processing unit 67 can be a component of the signal analyzer 46.

The predistortion unit 68 can be configured to perform a real time predistortion of the input signal 69 based on the predistortion algorithm. For example, the predistortion unit 68 can comprise a configurable non-linearity and filter. The predistortion unit 68 can be configured to adjust said configurable non-linearity and filter based on parameters of the derived predistortion algorithm, e.g. parameter coefficients of a Hammerstein model.

The system 60 can further comprise a signal generator. The signal generator can be configured to feed the, thus predistorted input signal 69 to the DUT 63. For example, the predistortion unit 68 can be a component of the signal generator or can be connected to the signal generator. The signal generator can the identical to the signal source 61 that was used to generate the reference input waveform.

In particular, the system 40 shown in FIG. 4 may be a part the system 60 shown in FIG. 6. For instance, the signal generator 42 and the signal analyzer 44 of the system 40 in FIG. 4 may correspond to the signal source 61 and the signal analyzer 66 of the system 60 in FIG. 6. Also the DUT 43 may be identical to the non-linear DUT 63 in FIG. 6. In particular, the system 40 in FIG. 4 may correspond to the part of the system 60 in FIG. 6 that is configured to characterize the DUT 43, 63 in order to derive the mathematical model.

Likewise, the system 50 shown in FIG. 5 may be a part the system 60 shown in FIG. 6. For instance, the signal generator 52, the signal analyzer 54 and the predistortion unit 56 of the system 50 in FIG. 5 may correspond to the signal source 61, the signal analyzer 66 and the predistortion unit 68 of the system 60 in FIG. 6. Also, the DUT 53 may be identical to the non-linear DUT 63 in FIG. 6. In particular, the system 50 in FIG. 5 may correspond to the part of the system 60 that is configured to apply the predistortion algorithm to an input signal of the DUT 53, 63.

All features of all embodiments described, shown and/or claimed herein can be combined with each other.

The invention claimed is:

1. A predistortion method for a non-linear device-under-test, DUT, comprising:
    providing a reference input waveform to the DUT;
    deriving a predistorted waveform for the DUT based on the reference input waveform using an iterative direct digital predistortion technique;
    analyzing a relationship between the reference input waveform and the derived predistorted waveform using a mathematical model, wherein the mathematical model comprises a Hammerstein model, a Wiener model, or a Volterra series model;
    deriving a predistortion algorithm for the DUT based on said analysis; and
    applying said predistortion algorithm to an input signal and feeding the, thus, predistorted input signal to the DUT.

2. The method of claim 1, wherein the predistortion algorithm compensates non-linear distortions as well as memory effects of the DUT.

3. The method of claim 1, wherein the mathematical model comprises a memory polynomial model.

4. The method of claim 3, wherein a starting point for the Hammerstein model is chosen randomly, and, in case the randomly chosen starting point does not converge, a different starting point is used.

5. The method of claim 1, wherein the step of analyzing the relationship between the reference input waveform and the derived predistorted waveform using the mathematical model comprises calculating parameters of the mathematical model, wherein said parameters depend on a hardware configuration of the DUT.

6. The method of claim 1, wherein a peak power of the reference waveform is increased while performing the iterative direct digital predistortion.

7. A predistortion method for a non-linear device-under-test, DUT, comprising:
    providing a reference input waveform to the DUT;
    deriving a predistorted waveform for the DUT based on the reference input waveform using an iterative direct digital predistortion technique;
    analyzing a relationship between the reference input waveform and the derived predistorted waveform using a mathematical model, wherein the mathematical model comprises a Hammerstein model, a Wiener model, or a Volterra series model;
    deriving a predistortion algorithm based on said analysis; and
    applying said predistortion algorithm in a signal generator.

8. The method of claim 7, wherein the predistortion algorithm compensates non-linear distortions as well as memory effects of the DUT.

9. The method of claim 7, wherein the signal generator is configured to perform a real-time predistortion of an input signal for the DUT based on said predistortion algorithm.

10. The method of claim 7, wherein the mathematical model comprises a memory polynomial model.

11. The method of claim 7, wherein the step of analyzing the relationship between the reference input waveform and the derived predistorted waveform using the mathematical model comprises calculating parameters of the mathematical model, wherein said parameters depend on a hardware configuration of the DUT.

12. A predistortion system for a non-linear device-under-test, DUT, comprising:
    a signal source configured to generate a reference input waveform to the DUT;
    a signal analyzer configured to receive an output waveform of the DUT,
    a processing unit configured to derive a predistorted waveform based on the reference input waveform and the output waveform using an iterative direct digital predistortion technique;
    wherein the processing unit is configured to analyze a relationship between the reference input waveform and the derived predistorted waveform using a mathematical model,
    wherein the mathematical model comprises a Hammerstein model, a Wiener model, or a Volterra series model,
    wherein the processing unit is configured to derive a predistortion algorithm for the DUT based on said analysis; and
    a predistortion unit configured to apply said predistortion algorithm to an input signal for the DUT.

13. The system of claim 12, wherein the predistortion unit is configured to perform a real-time predistortion of the input signal based on said predistortion algorithm.

14. The system of claim 12, wherein the system further comprises: a signal generator configured to feed the, thus, predistorted input signal to the DUT.

15. The system of claim 12, wherein the predistortion algorithm compensates non-linear distortions as well as memory effects of the DUT.

\* \* \* \* \*